United States Patent
Bötz et al.

[11] 3,902,217
[45] Sept. 2, 1975

[54] WIPING AND WASHING SYSTEM FOR A MOTOR VEHICLE WINDSHIELD AND HEADLAMPS

[75] Inventors: Jakob Bötz; Erich Mutschler, both of Bietigheim, Wurttemberg, Germany

[73] Assignee: SWF-Spezialfabrik fur Autozubehor Gustav Rau GmbH, Bietigheim, Germany

[22] Filed: July 12, 1974

[21] Appl. No.: 488,047

[30] Foreign Application Priority Data
Aug. 4, 1973 Germany............................ 2339660

[52] U.S. Cl. ........ 15/250.02; 15/250 A; 15/250.12; 318/DIG. 2; 318/443
[51] Int. Cl. ............................................. B60s 1/50
[58] Field of Search ...................... 15/250, 250 A, 15/250.01–250.04, 250.12; 318/DIG. 2, 483, 443

[56] References Cited
UNITED STATES PATENTS
| | | | |
|---|---|---|---|
| 3,058,142 | 10/1962 | Pollock............................ | 15/250 A |
| 3,500,119 | 3/1970 | Price................................ | 15/250 |
| 3,500,120 | 3/1970 | Schultz............................ | 15/250.02 |
| 3,641,613 | 2/1972 | Povilaitis et al.................. | 15/250 A |

Primary Examiner—Peter Feldman
Attorney, Agent, or Firm—McGlew and Tuttle

[57] ABSTRACT

A wiping and washing system for a vehicle windshield and for the vehicle headlamps include, a wiper motor connected to drive wipers for each headlamp and a fluid washing system which includes a container connected to a pump through a control valve which is electrically operated for supplying the washing fluid selectively to nozzles directed to the windshield and to the headlamps. The system is controlled through an electrical circuit connected to the ignition system of the vehicle which includes a light switch for the vehicle headlamps and a relay and pulse generator operated by a wash fluid switch which is depressed temporarily to cause the relay and pulse generator to actuate the washing pump and the wiper motor for the headlamps. The valve has a non-operating setting in which the fluid is circulated through the valve from the pump to the windshield washing nozzles and it also includes an operating setting in which the liquid is circulated from the pump through the valve to the headlamp washing liquid nozzles. The light circuit is connected to the headlamp wiper motor so that the motor is switched on only when the lights are switched on.

4 Claims, 1 Drawing Figure

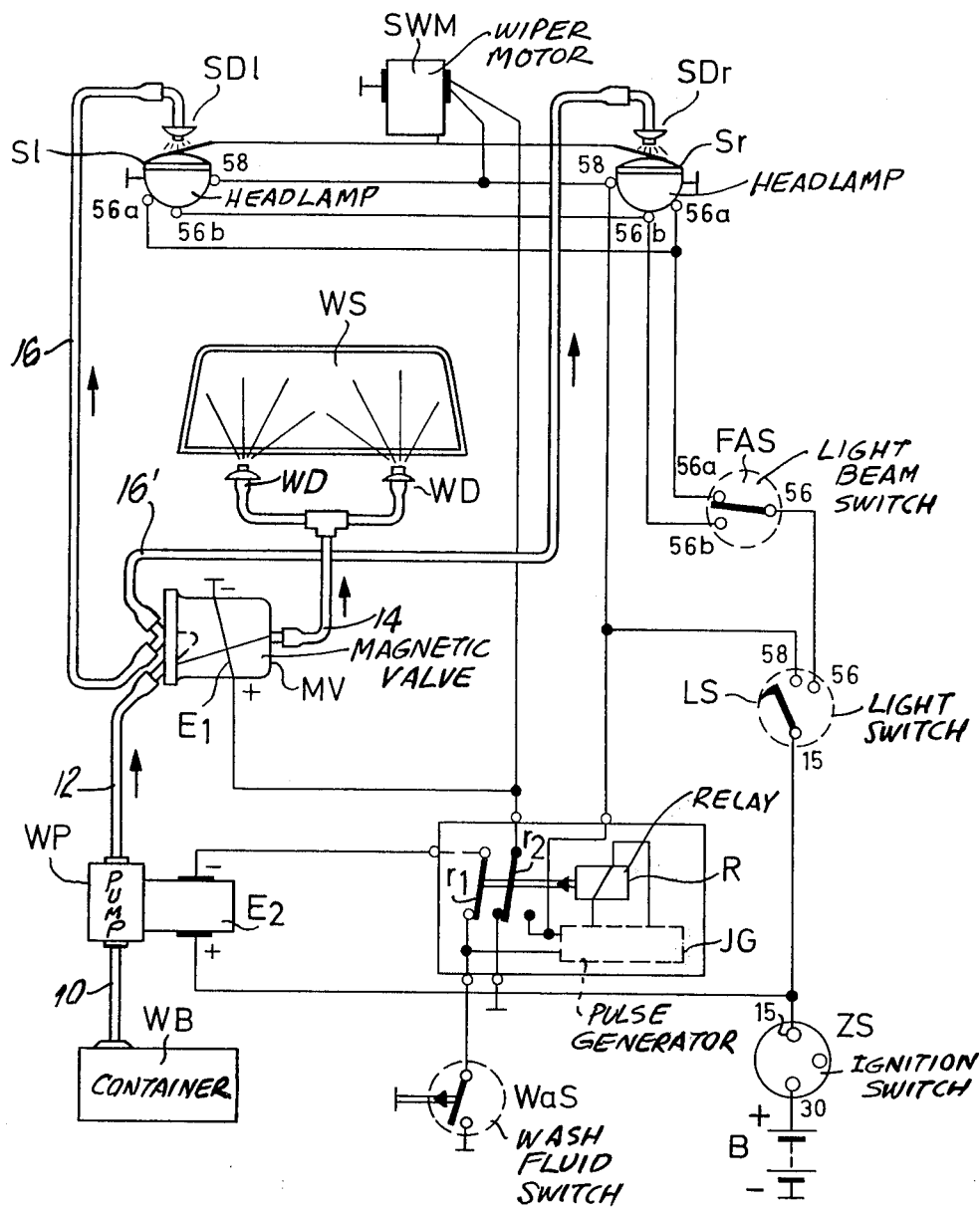

WIPING AND WASHING SYSTEM FOR A MOTOR VEHICLE WINDSHIELD AND HEADLAMPS

FIELD AND BACKGROUND OF THE INVENTION

This invention relates in general to the construction of vehicle wiper and washer systems and, in particular, to a new and useful wiper and washer system for headlamps and windshields, wherein the washing fluid is circulated for cleaning both the headlamps and windshield from a single container by a pump which is actuated through an electrical circuit connected to the ignition system of the vehicle and also to the lighting system.

DESCRIPTION OF THE PRIOR ART

Systems are known for both wiping and washing both headlamps and windshields. Such wiping and washing systems normally have two separate washer switches. One washer switch controls the washing pump which is connected to discharge washing fluid through windshield washing nozzles aimed at the windshield. A second washer switch actuates a magnetic valve, in addition to the washing pump, so that the magnetic valve allows the washing fluid to also flow to headlamp washing nozzles directed at the headlamps. The disadvantage of this conventional wiping and washing system is that the headlamp washing system may be switched on without being noticed, and that two separate washer switches are necessary. An improvement in the headlamp washer system has been achieved in that the headlamp washer system can be operated only when the light switch is on.

Wiper and washer installations are also known wherein, when the general wiper switch is actuated, both the windshield and the headlamp washing system are also actuated. With all of these conventional wiping and washing systems, it has become apparent that the simultaneous operation of the windshield and headlamp washing systems is a disadvantage since poor visibility conditions through the windshield occur, particularly at the beginning of the cleaning operation. This poor visibility is due to the smearing of the windshield at the beginning of the cleaning operation. The smearing is even worse when there is a simultaneous operation of the headlamp washing system since some of the washing fluid is diverted to the headlamp rather than being all directed to the windshield in the initial cleaning phase.

SUMMARY OF THE INVENTION

The present invention provides a wiping and washing system which includes a pulse generator and relay connection to a washing liquid pump which in turn is connected through a regulatable valve selectively to the windshield and to the headlamps. The system is connected in the motor ignition system and the connections are such that a time interval is obtained between the cleaning operations on the windshield and the headlamps. In addition, only a single washer switch is required and the headlamp wiping and the washer system for the headlamps is switched on only when the light switch is on.

In the preferred embodiment, the apparatus includes a single washing fluid container connected through a washing pump and a magnetically operated valve for controlling the flow of the washing fluid from the valve to the headlamp washing nozzles or to the windshield washing nozzles. The magnetic valve has a non-operated position which allows the washing liquid to flow to the windshield washing nozzle. In its operated position, the liquid may also flow to the headlamp washing nozzles. An impulse generator is provided which has a switching relay connected in its output which is connectable to a supply potential of the ignition circuit via a contact of the light switch and it is operated through a contact of the washer switch so that, after the switching off of the washer switch, the switch relay is energized for a predetermined time. A contact of the switch relay simultaneously operates the magnetic valve and the headlamp wiper motor and the washing liquid pump is controlled through a make contact of the switch relay.

When the light switch is switched off, only the windshield washing system is switched on through the washer switch, that is, for the time in which the switch is held in by an operator's hand, and in that condition, the washing liquid pump is switched on to direct the liquid only to the windshield nozzles. When the light switch is switched on, the windshield washing system is controlled in the same manner so that when the washer switch is switched off, the headlamp wiping and washing system is switched on for a period predetermined by the pulse generator. The magnetic valve and the headlamp wiper motor are switched on in addition to the pump.

Accordingly, it is an object of the invention to provide a wiping and washing system for a vehicle windshield and headlamp which includes only a single washing fluid switch which is capable of operation to direct the washing fluid solely to the windshield during initial operation and which may be connected so that the washing fluid is also directed to nozzles aimed at the headlamps and which is advantageously connected in the electrical ignition circuit of the vehicle, together with the lighting circuit, so that the headlamp washing will occur preferably only when the lights are switched on.

A further object of the invention is to provide a wiping and washing system for a vehicle windshield and headlamps which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a schematic representation of a wiping and washing system for a vehicle windshield and headlamps.

DESCRIPTION OF THE PREFERRED EMBODIMENT

Referring to the drawing in particular, the invention embodied therein, comprises a wiping and washing system for a vehicle having a windshield designated WS and a set of front headlamps Sl and Sr, respectively.

In accordance with the invention, there is provided a combined wiping and washing system for the headlamps and the windshield which includes a single container WB connected through a suction line 10 to a washing fluid pump WP. The pump WP has a discharge connection 12 which connects to a magnetic valve MV. Valve MV is magnetically operated and is controlled by a winding $E_1$. In accordance with the valve setting, the fluid is discharged either through a single discharge conduit 14 directly to nozzles WD aimed at the windshield WS or, the liquid may also be directed through a discharge conduit 16 or 16' which are connected to respective nozzles SD$l$ and SD$r$ which are aimed at headlamps S$l$ and S$r$.

In accordance with the invention, the valve MV and the pump WP are controlled by respective winding coils $E_1$ and $E_2$ from a pulse generator and relay JG and R, respectively, which are connected in an ignition circuit of the motor vehicle. In addition, a lighting circuit, including a lighting switch LS and a light beam switch FAS are connected to a terminal 15 of the ignition switch of the vehicle and two respective headlamps S$l$ and S$r$. A parking light may be switched on via a terminal 58 of the light switch LS and a terminal 56 of the light switch LS is connected to the headlamps S$l$ and S$r$ via the dip switch FAS. The terminals 56$a$ and 56$b$ permit operation of the main switch LS and the light beam switch FAS, as desired. The headlamp wiper motor SWM is connected to the terminal 58 and it may be switched on via a contact r2 of the switch relay R.

In accordance with a feature of the invention, the magnetic valve MV, in its non-energized operating condition, connects an outlet of the washing pump WP to the windshield washing nozzles WD through the discharge connection 14. If the exciter winding $E_1$ of the magnetic valve MV is operated, however, the magnetic valve switches over and connects the headlamp washing nozzles SD$l$ and SD$r$ to the washing pump WP.

The potential supply indicated B+ from the vehicle battery is fed through the ignition switch ZS. The terminal 30 of the ignition switch is connected to the +B terminal of the battery.

A further feature of the construction is that the combined washing system for both the windshield and the headlamps is initiated by means of a single washer switch WaS. Any selective operation between the windshield WS and the headlamps S$l$ and S$r$ depends upon a position of the light switch LS. If the light switch LS is in the off position as shown in the circuit diagram, then when the washer switch WaS is switched on, only the washer pump WP is operated through the rest contact $r_1$. The washing pump WP thus feeds the washing fluid from the washing fluid container WB to the windshield washing nozzles WD, WD, through the magnetic valve MV. This is the non-operated position of the valve MV. The pulse generator JG is not operated, and therefore, the headlamp wiping and washing system is not operated. The washing operation of the windshield WS is concluded upon the release of the washing switch WaS. This washing switch WaS advantageously comprises a push button switch which returns to its off position when it is released by the operator.

When the washing switch WaS is pushed and the lighting switch LS is switched on, then the connection terminal 58 conducts the feed potential +B to the headlamp wiper motor SWM and to the pulse generator JG. When the washer switch WaS is closed, with the light switch LS on, both the windshield WS and the headlamps S$l$ and S$r$ will receive the cleaning liquid and the wiper motor SWM will be turned on. The pulse generator JG is simultaneously actuated through the washer switch WaS and it is constructed so that, after the opening of the washer switch WaS, a predetermined time is allowed to elapse. During this time, the pulse generator JG keeps the switch relay R attracted, so that the contacts $r_1$ and $r_2$ of the switch relay R assume their other switching positions. The contact $r_1$ keeps the washing pump WP in operation, while the contact $r_2$ operates the magnetic valve MV and the headlamp wiper motor SWM in parallel. Thus, after the cleaning operation of the windshield has been completed, the washing fluid is fed through the reversed magnetic valve MV to the washing nozzles SD$l$ and SD$r$ of the headlamps S$l$ and S$r$ for the operating time of the switch relay R. After the operating time of the pulse generator JG and the switch relay R, the starting position shown in the drawing is resumed.

While a specific embodiment of the invention has been shown and described in detail to illustrate the application of the principles of the invention, it will be understood that the invention may be embodied otherwise without departing from such principles.

What is claimed is:

1. A wiping and washing system for a vehicle windshield and headlamps, comprising a headlamp wiper motor, a wiper associated with the headlamp connected to said headlamp wiper motor for operation thereby to move over the headlamp in cleaning engagement therewith, a headlamp washing liquid nozzle directed at the headlamp, a windshield washing liquid nozzle directed at the windshield, a container for washing liquid, an electrically operated valve connected between said container and said headlamp washing nozzle and said windshield washing nozzle, a pump connected to said container and said valve, an ignition circuit for the vehicle including a relay and a pulse generator connected in said ingition circuit and to said pump, said valve and said headlamp wiper motor, a headlamp lighting circuit connected to said ignition circuit and said pulse generator and relay and including a headlamp switch, a wash fluid switch connected to said relay and pulse generator in said ignition circuit, said valve having a non-operating setting in which fluid is circulated therethrough from said pump to said windshield washing nozzles, said valve also having an operating setting in which liquid is circulated therethrough from said pump to said headlamp washing liquid nozzles, said impulse generator and said relay being operable by energizing of said washer switch, said relay energizing said impulse generator for a period of time of operation after said washer switch is released, said valve and said headlamp wiper motor and said pump being simultaneously operated by said relay.

2. A wiping and washing system for a vehicle windshield and headlamps, according to claim 1, wherein said relay includes a contact, said washer switch having a make contact in series with said relay contact.

3. A wiping and washing system for a vehicle windshield and headlamps, according to claim 1, wherein said pulse generator is constructed so that it is prepared during the closing of said washer switch contact and is started with the opening thereof.

4. A wiping and washing system for a vehicle windshield and headlamps, according to claim 1, wherein said light circuit includes a main light switch and a light beam switch connected in said light circuit.

* * * * *